(12) United States Patent
Saarela

(10) Patent No.: US 8,520,645 B2
(45) Date of Patent: Aug. 27, 2013

(54) METHOD OF CONTROLLING A MOBILE TERMINAL, AND AN ASSOCIATED MOBILE TERMINAL

(75) Inventor: Timo Saarela, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1788 days.

(21) Appl. No.: 11/477,810

(22) Filed: Jun. 30, 2006

(65) Prior Publication Data

US 2008/0002638 A1  Jan. 3, 2008

(51) Int. Cl.
*H04W 4/00* (2009.01)

(52) U.S. Cl.
USPC ..... 370/338; 455/434; 455/435.2; 455/552.1; 455/450

(58) Field of Classification Search
USPC .............. 370/338; 455/41.2, 456.1, 435.2, 455/552.1
See application file for complete search history.

(56) References Cited

U.S. PATENT DOCUMENTS

| | | | | |
|---|---|---|---|---|
| 5,754,956 | A * | 5/1998 | Abreu et al. | 455/434 |
| 6,298,235 | B1 * | 10/2001 | Bamburak et al. | 455/434 |
| 6,611,692 | B2 * | 8/2003 | Raffel et al. | 455/552.1 |
| 7,167,707 | B1 * | 1/2007 | Gazzard et al. | 455/434 |
| 7,706,790 | B2 * | 4/2010 | Dunn et al. | 455/434 |
| 7,907,946 | B2 * | 3/2011 | Welnick et al. | 455/434 |
| 8,116,776 | B1 * | 2/2012 | Jagadeesan et al. | 455/438 |
| 8,169,953 | B2 * | 5/2012 | Damnjanovic et al. | 370/329 |
| 2001/0006892 | A1 * | 7/2001 | Barnett et al. | 455/434 |
| 2002/0065070 | A1 | 5/2002 | Naiki | |
| 2002/0090929 | A1 | 7/2002 | Cho | |
| 2003/0039360 | A1 | 2/2003 | Younis | |
| 2005/0153692 | A1 * | 7/2005 | Hwang et al. | 455/434 |
| 2005/0195777 | A1 * | 9/2005 | Green | 370/338 |
| 2006/0063560 | A1 * | 3/2006 | Herle | 455/552.1 |
| 2007/0165583 | A1 * | 7/2007 | Pecen | 370/338 |
| 2008/0068130 | A1 * | 3/2008 | Batta et al. | 340/10.1 |
| 2011/0003590 | A1 * | 1/2011 | Yoon et al. | 455/432.1 |
| 2012/0071163 | A1 * | 3/2012 | Klingenbrunn et al. | 455/435.2 |

FOREIGN PATENT DOCUMENTS

| | | |
|---|---|---|
| EP | 1035746 A1 | 9/2000 |
| EP | 1453285 A1 | 9/2004 |
| GB | 2371907 A | 2/2001 |
| GB | 2374968 A | 1/2002 |
| JP | 2000-152217 | 5/2000 |
| WO | 9918745 A1 | 4/1999 |
| WO | 03063537 A1 | 7/2003 |
| WO | 2005002263 A1 | 1/2005 |

* cited by examiner

*Primary Examiner* — Sharad Rampuria
(74) *Attorney, Agent, or Firm* — Winstead PC

(57) ABSTRACT

A method is disclosed for controlling a mobile terminal having a first wireless interface for cellular communication in a mobile telecommunications network and a second wireless interface for non-cellular wireless communication, such as wireless local area network (WLAN) communication, in at least one frequency band. In the mobile terminal, the following steps are performed. Information is received from the mobile telecommunications network, and the information is processed. Then, based on an outcome of the processing of the information, the second wireless interface is disabled from wireless communication in at least one frequency band.

22 Claims, 3 Drawing Sheets

METHOD OF CONTROLLING A MOBILE TERMINAL, AND AN ASSOCIATED MOBILE TERMINAL

FIELD OF THE INVENTION

The present invention relates to mobile terminals, and more specifically to a method of controlling, for a mobile terminal having a first wireless interface for cellular communication in a mobile telecommunications network and a second wireless interface for non-cellular wireless communication in at least one frequency band, disablement of the second wireless interface. The invention also relates to an associated mobile terminal.

BACKGROUND OF THE INVENTION

Nowadays, mobile terminals such as mobile (cellular) phones, personal digital assistants (PDAs) or communicators have many different functions in addition to the conventional one, i.e. to serve as a means for mobile telecommunication of speech between a user of the mobile terminal and another user of a remote device. Examples of such additional functions include camera functionality (involving for instance the capturing of still images or recording of video), audio functionality (involving for instance playback of locally stored or remotely downloaded music), and electronic messaging functionality (such as short message services (SMS), multimedia messaging services (MMS) or email).

As is familiar per se, not all such functionality of mobile terminals is suitable for use everywhere. For instance, use of the terminal's cellular radio interface may be prohibited in hospitals or onboard airplanes. Likewise, camera use may be prohibited in restricted areas such as military bases, corporate premises or at concerts. Audio playback may be prohibited in libraries or at cinemas, etc.

WO2005/002263 discloses a method for temporarily preventing a certain function of a portable device, such as a mobile terminal. Upon receipt of a blocking key via cable, over a wireless link or in an electronic message, a certain function is blocked in the portable device. The certain function may for instance be a camera function. When subsequently receiving an unblocking key, the certain function may be reactivated in the portable device.

More recently, mobile terminals have been developed and introduced which not only have a first wireless interface that permits cellular communication of speech, video or data in a mobile telecommunications network, but in addition a second wireless interface for communication without the use of said mobile telecommunications network.

The first wireless interface is typically adapted for cellular communication in compliance with mobile telecommunication standards such as GSM, UMTS, D-AMPS, CDMA2000, FOMA or TD-SCDMA performed in one or more frequency bands such as 900 MHz, 1800 MHz or 1900 MHz.

The second wireless interface may typically involve short-range supplementary data communication such as Bluetooth at 2.4 GHz, or GPS services. Another example is WLAN (Wireless Local Area Network) access, which is sometimes referred to as Wifi. In the year 1997, the Institute of Electrical and Electronics Engineers (IEEE) ratified the 802.11 specification [IEEE Std 802.11 (ISO/IEC 8802-11: 1999)] as a standard for wireless LANs. IEEE 802.11 enables mobile stations to communicate through a wireless network interface directly with each other or with other stations through an access point. An access point is a centralized gateway providing message and power management and access to an external LAN and/or the Internet. IEEE 802.11 access products are currently widely sold with personal computers, computer peripherals, print servers, and mobile devices such as laptops or mobile terminals like cellular phones, PDAs and communicators. The operating range of a wireless local area network may be up to a few hundred meters in distance, thereby making it very useful for mobile network access in office buildings, warehouses, hospitals, campuses, train stations, airports and many other public areas.

There are a plurality of different protocols within the IEEE 802.11 standards, using different frequency bands and having varying data transmission speeds for wireless packet data communication. The original IEEE 802.11 standard supported wireless interfaces operating at speeds of up to 2 megabit per second (Mbps) in the 2.4 GHz radio frequency (RF) or microwave band, or more specifically between 2.4 and 2.497 GHz. By using different modulation techniques, IEEE 802.11b raised the data transmission rates to 11 Mbps, while IEEE 802.11a supports up to 54 Mbps transmission rates in a 5 GHz band, or more specifically between 5.15 and 5.875 GHz. Moreover, IEEE 802.11g is developing standards for data transmission rates of 54 Mbps in the 2.4 GHz band.

Alternative wireless LAN technologies are HiperLAN2 (operating in the 5 GHz (specifically 5.4 to 5.7 GHz) U-NII band), WiMAX (Worldwide Interoperability for Microwave Access, which is an IEEE 802.16 standard and typically operates in a frequency band located somewhere between 2.5 and 5.8 GHz), and HomeRF.

The terminologies "wireless local area network", "wireless LAN" or just "WLAN" are used in the remainder of this document as a general reference to any available technology for wireless data communication, including but not limited to any of the technologies referred to above.

A problem with WLAN is that even if the frequency bands mentioned above are normally unlicensed and therefore freely available in most countries, they may nevertheless be reserved for licensed use, for e.g. governmental or military purposes, in individual countries, or may even be completely forbidden to use in such a country. Therefore, manufacturers of mobile terminals may have to design separate versions of mobile terminals, where the WLAN module has been removed, for sale in such countries. Having to design separate versions has apparent drawbacks in terms of design cost, marketing expenses, and service and repair.

In US 2005/0153692, a method and a system are presented for a mobile terminal having both a first wireless interface for cellular telecommunications and a second wireless interface for WLAN access. In this system, the mobile telecommunications network transmits a broadcast signal to the mobile terminal containing information on available (interworking) WLAN(s) in the current cell of the mobile telecommunications network. If no available WLAN is indicated in the information received from the mobile telecommunications network, the mobile terminal maintains its WLAN interface in an inactive sleeping mode for powersaving purposes. On the other hand, if the signal indicates presence of a WLAN in the current cell, the mobile terminal activates its WLAN interface and causes it to scan for WLAN access points (APs) in the neighborhood. To this end, the broadcasted information may contain data that facilitates for the mobile terminal to connect to the WLAN, for instance data regarding type, identity or frequency channels of the WLAN.

Thus, in the approach of US 2005/0153692, the WLAN interface is normally kept in a sleeping mode, unless information is provided from the mobile telecommunications network to the effect that there is an available WLAN nearby.

While this service may have its benefits when it comes to powersaving, it still has some drawbacks.

Firstly, modification of the mobile telecommunications network is required, so that it supports this service. Secondly, if the mobile terminal is used in a mobile telecommunications network where this service is not available (for instance if the terminal is brought abroad and uses roaming), or if the service is simply interrupted for some reasons in a current cell of a network where it would normally be provided, the WLAN interface will be kept in its sleeping mode forever, and the mobile terminal may fail to avail itself of opportunities to WLAN access as they may exist.

SUMMARY OF THE INVENTION

One objective of the invention is to improve the problem situation described above for mobile terminals having a first wireless interface for cellular communication in a mobile telecommunications network and a second wireless interface for non-cellular communication.

This objective is obtained, according to a first aspect of the invention, by a method of controlling a mobile terminal having a first wireless interface for cellular communication in a mobile telecommunications network and a second wireless interface for non-cellular wireless communication in at least one frequency band, the method involving the steps, in said mobile terminal, of:

receiving information from said mobile telecommunications network;

processing said information; and disabling, based on an outcome of said processing of said information, said second wireless interface from wireless communication in at least one frequency band.

Said step of receiving information may involve receiving control information from a node, such as a base station, in said mobile telecommunications network over said first wireless interface.

Said steps of processing and disabling may be based on a country code, network code or operator code associated with said mobile telecommunications network and derivable from the control information received from said node.

Alternatively, said step of disabling may be performed if said control information includes a disabling command.

Advantageously, in a case where said at least one frequency band disabled in said step of disabling is a frequency band which is unlicensed (i.e. allowable) in a first country or geographic area, but is reserved, prohibited or otherwise unavailable (i.e. non-allowable) in a second country or geographic area, said step of disabling may be performed if the information received in said step of receiving indicates that said mobile telecommunications network is associated with, e.g. installed in, said second country or geographic area.

Said step of processing may involve comparison between contents of said information and reference data stored in local memory of said mobile terminal, wherein said step of disabling is performed if the outcome of said processing is a match from said comparison, indicating that said mobile telecommunications network is associated with said second country or geographic area.

In one embodiment, said second wireless interface is capable of wireless communication in at least a first and a second frequency band, wherein said step of disabling involves disabling the second wireless interface from wireless communication in said first frequency band but not in said second frequency band. Alternatively, said step of disabling may involve disabling the second wireless interface from wireless communication in said first frequency band as well as in said second frequency band.

The objective stated above is also obtained, according to a second aspect of the invention, by a mobile terminal having a first wireless interface for cellular communication in a mobile telecommunications network, a second wireless interface for non-cellular communication, and a controller coupled to said first and second wireless interfaces, wherein the controller is adapted to:

receive information from said mobile telecommunications network;

process said information; and disable, based on an outcome of said processing of said information, said second wireless interface from wireless communication in at least one frequency band.

The second wireless interface may be an interface adapted for connectionless packet data communication. More particularly, or alternatively, the second wireless interface may be a wireless local area network interface being compliant with a communication standard selected from the group consisting of: IEEE 802.11, IEEE 802.11a, IEEE 802.11b, IEEE 802.11g, HiperLAN2, WiMAX (IEEE 802.16), and HomeRF.

The first wireless interface may be an interface adapted for cellular communication in compliance with mobile telecommunication standards such as GSM, UMTS, D-AMPS, CDMA2000, FOMA or TD-SCDMA. The mobile terminal may thus be a mobile (cellular) phone, personal digital assistant, communicator, etc.

In one embodiment, where the second wireless interface is capable of wireless communication in at least a first and a second frequency band, and the mobile terminal further has local memory for storing reference data, said reference data defines a mapping between different countries, geographic areas or mobile telecommunications networks, represented by at least one of a country code, network code or operator code, and allowability or non-allowability of different frequency bands for non-cellular wireless communication;

the controller is adapted to receive said information over said first wireless interface as control information from a node in said mobile telecommunications network;

the controller is adapted to process said control information received from said node by deriving at least one of a country code, network code or operator code associated with said mobile telecommunications network, and comparing the derived country code, network code or operator code to said reference data to produce said outcome of said processing; and the controller is adapted to disable the second wireless interface from wireless communication in said first frequency band, said second frequency band, none of said first and second frequency bands, or both of said first and second frequency bands, depending on said outcome of said processing.

The local memory may comprise non-volatile memory in which said reference data is stored in a manner that prevents manipulation.

In one embodiment, where the mobile terminal further has a user interface, the controller is adapted to provide an alert in said user interface, before disabling said second wireless interface. The controller may further be adapted, after having provided said alert in said user interface, to await a confirmation from a user of the mobile terminal before disabling said second wireless interface.

The controller of the mobile terminal according to the second aspect may be adapted to perform any of the steps of the method according to the first aspect described above, and the mobile terminal according to the second aspect may have the same or corresponding features and advantages as the method according to the first aspect. Correspondingly, the method according to the first aspect may contain steps that perform any of the functionality specified above for the mobile terminal according to the second aspect.

Simply put, according to these aspects of the invention, in contrast to the approach described in the background section, the normal situation for a mobile terminal according to a typical embodiment will be to keep the WLAN interface enabled and have it disabled once it has been detected that the mobile telecommunications network that the cellular interface interacts with is at least either located in a country or operated by a network operator that does not permit usage of the WLAN interface. The above notwithstanding, the enabled state of the WLAN interface may include different modes, such as powersaving mode, idle mode and active mode (scanning for available WLAN resources).

These aspects of the invention have advantages in terms of security and simplicity both for operators of mobile telecommunications networks and for manufacturers or providers of mobile terminals, and also in terms of safety and convenience for end users of mobile terminals. For instance, since the mobile terminals preferably make use of control information such as country code, network code or operator code, which is already available in existing mobile telecommunications networks, there is no need for network operators to modify their mobile telecommunications networks to have them work with the present inventive aspect. Moreover, since the mobile terminals are preferably adapted to control the enablement or disablement of their second wireless interface (WLAN interface) automatically based on the aforesaid control information from the mobile telecommunications networks, end user convenience is obtained, and at the same time the manufacturers or providers of mobile terminals do not have to design special models for countries where WLAN access is not allowed or limited to certain frequency band(s).

As used herein, a "frequency band" is not limited to any particular minimal width and may be as narrow as a single frequency for applications where the second wireless interface is operable at such a single frequency.

Other objectives, features, aspects and advantages of the present invention may appear from the following detailed description of exemplifying embodiments, from the appended dependent claims and from the drawings.

BRIEF DESCRIPTION OF THE DRAWINGS

Exemplifying embodiments of the present invention will be described in more detail below with reference to the appended drawings, where.

DETAILED DESCRIPTION OF THE INVENTION

Aspects of the invention will now be described in accordance with exemplifying embodiments thereof and with reference to FIGS. 1-3.

Figure 1:
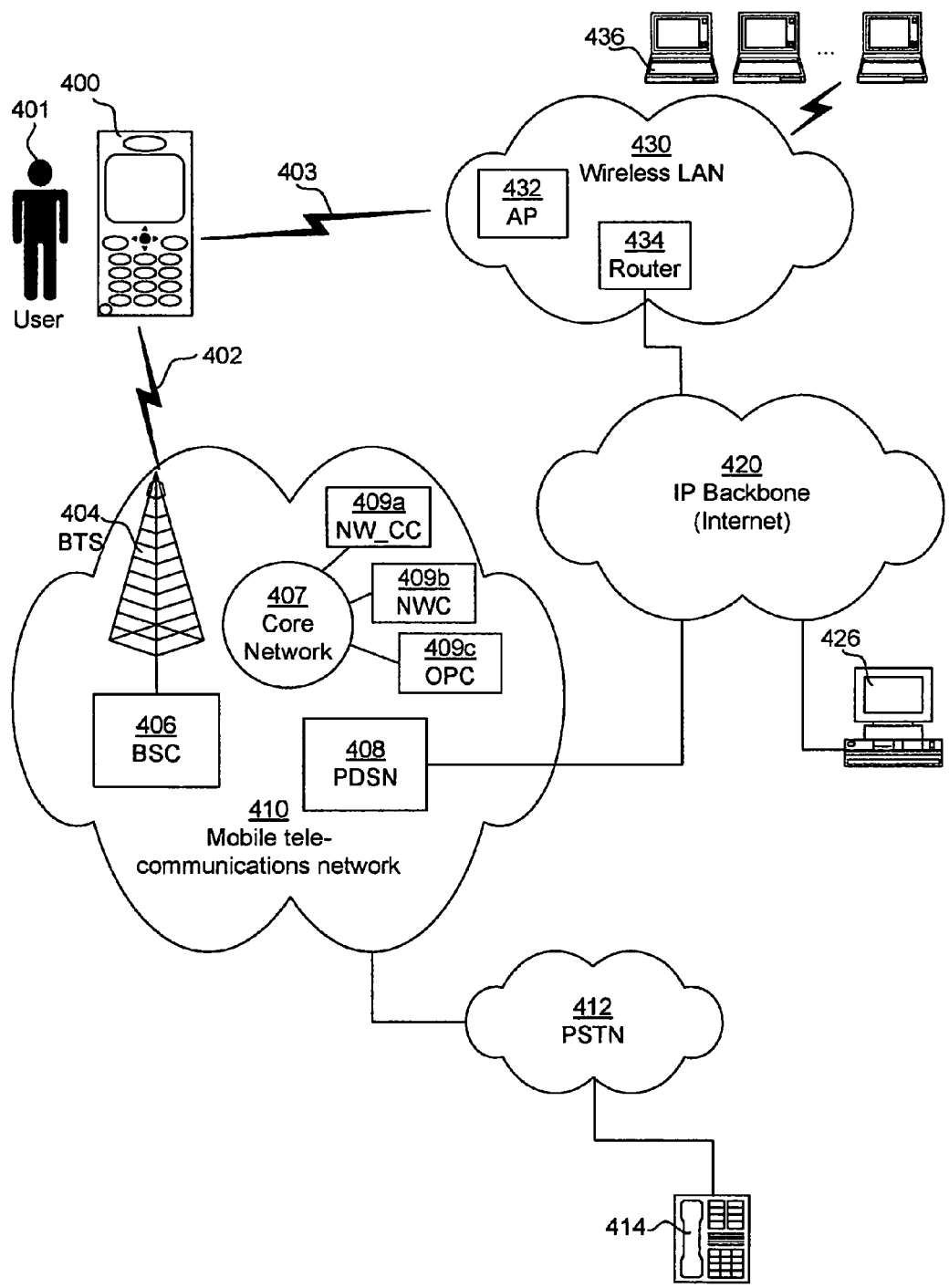
FIG. 1 illustrates an environment, including a cellular mobile telecommunications network and a wireless LAN, in which a mobile terminal according to the invention may be applied.
Figure 2:
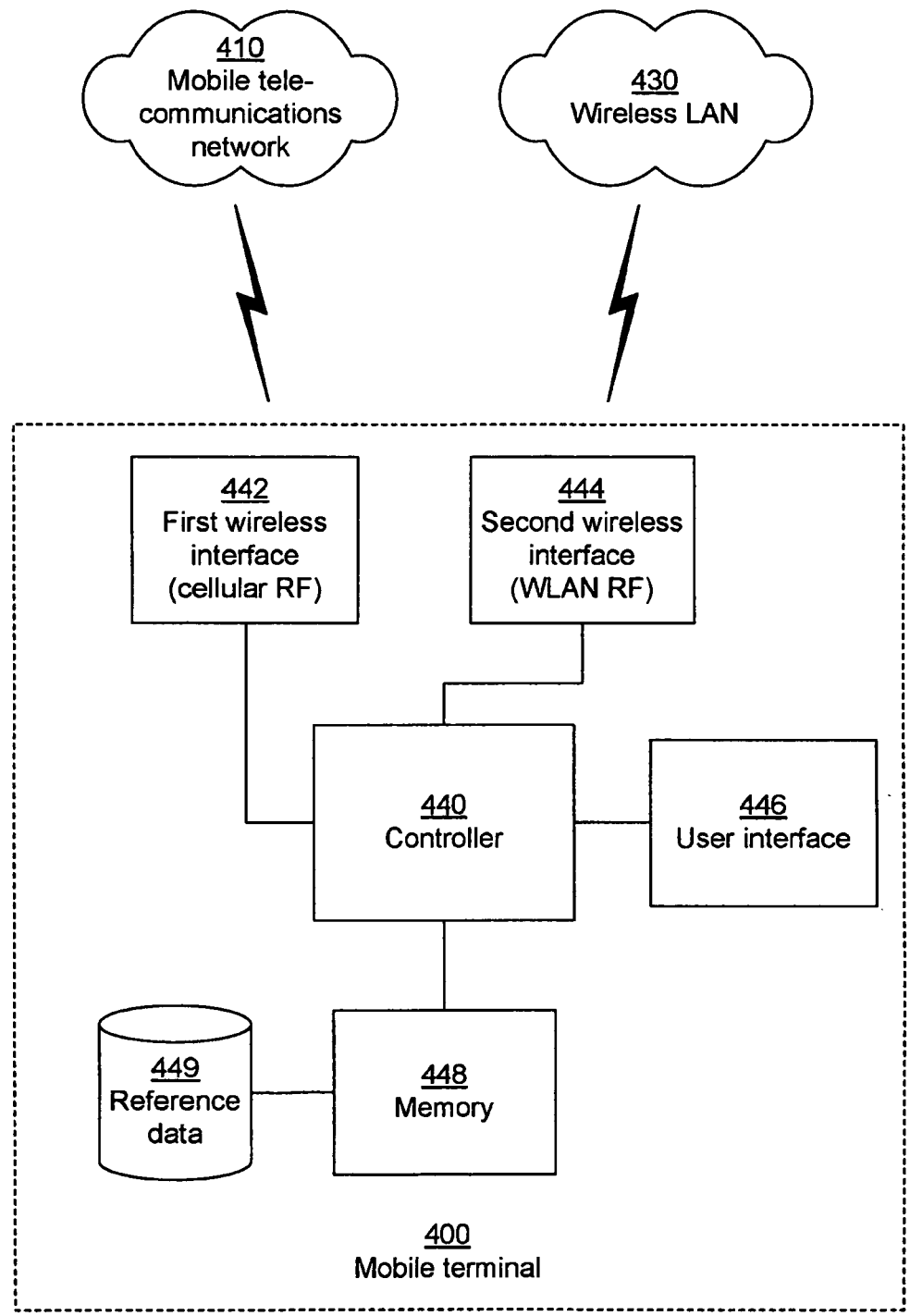
FIG. 2 is a schematic block diagram of a mobile terminal according to one embodiment.

FIG. 1 illustrates a typical operating scenario for a mobile terminal 400 which is shown in more detail in FIG. 2. The mobile terminal 400 has a first wireless interface 442 and a second wireless interface 444, both controlled by a controller 440 which in addition has associated local memory 448. The controller 440 may be implemented by any commercially available CPU ("Central Processing Unit"), DSP ("Digital Signal Processor"), or any other electronic programmable logic device, including an application-specific integrated circuit (ASIC). The controller 440 may also be responsible for the overall operation of the mobile terminal 400. The associated memory 448 may be for instance RAM memory, ROM memory, EEPROM memory, flash memory, magnetic disk, or any combination thereof.

A user interface 446 contains typical input/output elements such as any combination of a display, keypad, joystick, single keys, touchscreen, touchpad, etc, and allows a user 401 to operate the mobile terminal 400.

The first wireless interface 442 is adapted for cellular communication in compliance with any commercially available mobile telecommunication standard such as GSM, UMTS, D-AMPS, CDMA2000, FOMA or TD-SCDMA performed in one or more frequency bands such as 900 MHz, 1800 MHz or 1900 MHz. Thus, the mobile terminal may connect to and perform cellular communication with a mobile telecommunications network 410 through a wireless link 402 established between the first wireless interface 442 and a base station (BTS) 404 included in the mobile telecommunications network 410. The base station 404 is connected to a base station controller (BSC) 406 that in turn is operatively connected to various central modules (represented jointly as core network 407 in FIG. 1) which provide central functionality in the network. The particulars of such central modules are well known to a skilled person in the field of mobile telecommunications, and a detailed description thereof is left our herein in order not to obscure the invention in unnecessary detail.

By means of the mobile terminal 400 and the mobile telecommunications network 410, the user 401 may use various connection-oriented and connectionless telecommunications services such as voice calls, data calls, facsimile transmissions, music transmissions, still image transmissions, video transmissions, electronic message transmissions (e.g. SMS, MMS, email, instant messaging) and electronic commerce. These services include for instance telephone communication with telephone terminals 414 in other telecommunication networks, such as a public switched telephone network (PSTN) 412, and packet-switched data communication with a remote unit 426 via a packet data serving node (PDSN) 408 and an IP backbone 420, which may be the Internet or a part thereof.

The second wireless interface 444 is adapted for non-cellular wireless communication, i.e. wireless communication that does not directly involve the cellular mobile telecommunications network 410. Preferably, the second wireless interface 444 is adapted for connectionless packet data communication in or with a wireless local area network (WLAN) 430 being compliant with any commercially available communication standard, for instance selected from the group consisting of: IEEE 802.11, IEEE 802.11a, IEEE 802.11b, IEEE 802.11g, HiperLAN2, WiMAX (IEEE 802.16), and HomeRF.

The second wireless interface 444 may be adapted for operation in one RF (radio frequency) or microwave frequency band, or in any of a number of such frequency bands, potentially partially overlapping each other, for wireless communication 403 via an access point (AP) 432 with remote resources within the WLAN 430 (e.g. units 436) or accessible through it. For instance, such remote resources may be part of a business or university intranet, or may be mobile Internet resources 426 on the IP backbone 420, accessed over a router 434.

Figure 3:
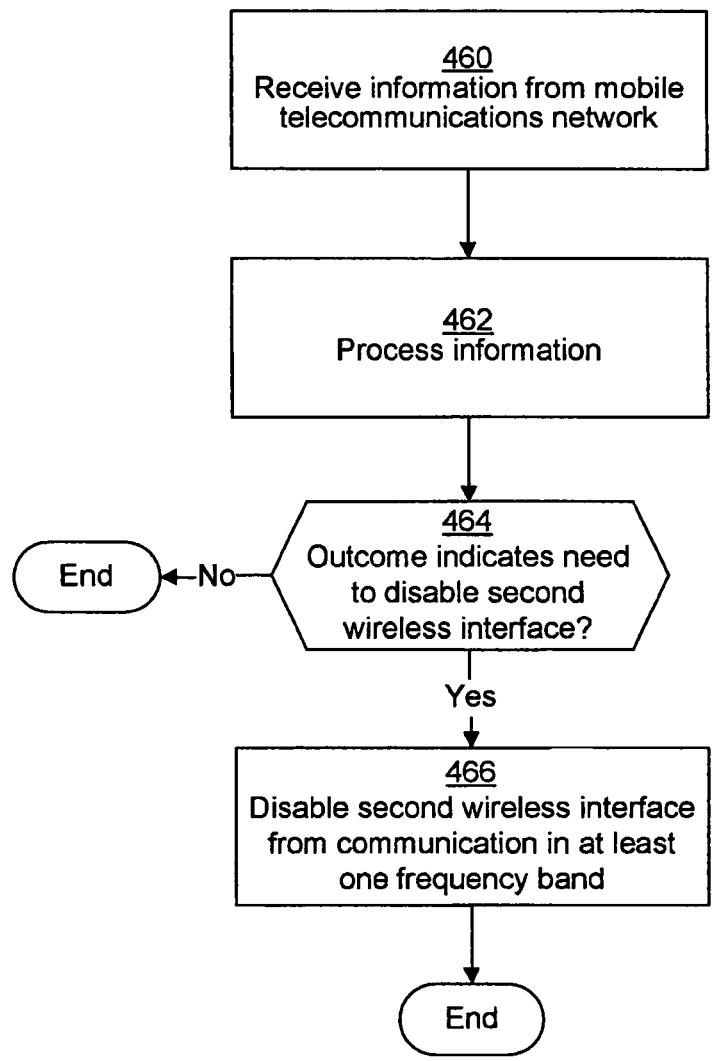
FIG. 3 illustrates a method of controlling a mobile terminal according to one embodiment.

Whereas the first wireless interface 442 is normally constantly enabled and operative (possibly subject to certain exceptions due to powersaving schedules, flight mode, etc), complete or partial disablement of the second wireless interface 444 may be controlled in the manner which is illustrated generally in FIG. 3.

Normally, also the second wireless interface 444 is kept enabled and operative (possibly subject to certain exceptions due to powersaving schedules, flight mode, etc), thereby allowing the interface 444 to scan for available APs 432, communicate with resources 436, 426 over the WLAN 430 once identified, etc. This is true so long as the mobile terminal 400 is present in a country or geographic area where WLAN access is available and allowed in all or some of the frequency bands supported by the second wireless interface 444. The mobile terminal 400 uses information which is received, step 460, from the mobile telecommunications network 410 over the first wireless interface 442 to control whether the second wireless interface 444 is to be enabled or disabled.

To this end, in one embodiment, the controller 440 uses geographical information about the mobile telecommunications network 410, in the form of the country code (NW_CC 409a) of the country in which the network 410 is installed. Such country codes may preferably follow the list of assigned country codes in the ITU-T recommendation E.164 (ITU-T=the Telecommunication standard sector of the International Telecommunication Union). The country code NC_CC 409a is either automatically included in control information sent from the core network 407 to the mobile terminal 400, for instance at system access, or is otherwise easily retrievable from the network 410 by the mobile terminal 400.

Thus, in this embodiment, the local memory 448 of the mobile terminal 400 has been provided with reference data 449 defining, for each of a number of ITU-T country codes, whether and/or to what extent wireless LAN access is allowed. Such reference data 449 may look like:

| Country code | WLAN allowed |
| --- | --- |
| 1 | Y |
| 46 | Y |
| 972 | N |
| ... | ... | where
"Y" means Yes and
"N" means No.

Or, if the second wireless interface 444 supports more than one WLAN frequency band $\Delta f_1, \Delta f_2, \ldots, \Delta f_n$:

| Country code | $\Delta f_1$ | $\Delta f_2$ | ... | $\Delta f_n$ |
| --- | --- | --- | --- | --- |
| 1 | Y | Y | ... | Y |
| 46 | Y | N | ... | N |
| 972 | N | N | ... | N |
| ... | ... | ... | ... | ... |

Thus, in the latter example, each row in this mapping or table defines the allowability and non-allowability, respectively, of WLAN access in different frequency bands for different countries, as represented by their country codes.

In this example, WLAN access is allowed in the country having country code 1 for all frequency bands $\Delta f_1, \Delta f_2, \ldots, \Delta f_n$, whereas only frequency band $\Delta f_1$ is allowed in the country having country code 46, and WLAN access is completely prohibited in the country having country code 972.

Once the aforesaid information has been received by the controller 440 of the mobile terminal 400 in step 460, the controller 440 processes the received information in step 462 by comparing the country code derived from the received information with the reference data 449 in local memory 448. If the outcome of the comparison in step 462 is a match with any record in the reference data 449, the controller 440 uses such record in step 464 to determine whether the second wireless interface 444 needs to be disabled, either fully (all frequency bands), or partly (some frequency band(s)). In the subsequent step 466, the controller 440 effectuates the disablement of the second wireless interface, if deemed necessary in step 464.

Preferably, the reference data 449 is stored in non-volatile memory in a manner that prevents manipulation. In other words, the local memory 448 may at least partly be implemented as for instance a PROM, EPROM, EEPROM, flash memory or magnetic disk.

The reference data may be stored already by the manufacturer or provider of the mobile terminal, prior to delivery to the end-customer (user 401). For safety reasons, restrictions may apply as regards whether or in what manner such reference data 449 may be upgraded later.

As an alternative to NW_CC 409a, the information used by the controller 440 in steps 460-466 may relate to data that only indirectly indicates the country or geographic area in which the network 410 is installed. For instance, the information may be a network code (NWC) 409b or operator code (OPC) 409c, that identifies the network and/or its operator. For instance, in GSM, each network operator is provided with a 5-digit network code "xxxyy", where "xxx" indicates the country and "yy" uniquely identifies the operator among the available operators in that country. Thus, in this alternative, the first three digits "xxx" of the 5-digit network code may replace the country code in the examples above.

In another embodiment, the information used by the controller 440 in steps 460-466 may be in the form of a WLAN disable command received over any available communication channel in the mobile telecommunications network, such as a cellinformation channel or broadcast channel, or received as an electronic message such as SMS, MMS or email.

In some embodiment(s), the user 401 is given an alert in the user interface 446 when the controller 440 has decided to disable the second wireless interface 444 in step 464. Depending on implementation, such an alert may be purely informative, or it may invite the user 401 to confirm that the second wireless interface 444 is in fact to be disabled.

Depending on implementation, the first and second wireless interfaces 442, 444 may consist of two separate and complete chain of components, starting from a respective antenna and including respective hardware and software components such as RF receiver/transmitter and network protocol stacks, or they may share certain components such as the antenna and the RF receiver/-transmitter, or parts thereof.

The invention has mainly been described above with reference to a few exemplifying embodiments. However, as is readily appreciated by a person skilled in the art, other embodiments than the ones disclosed above are equally possible within the scope of the invention, as defined by the appended patent claims.

What is claimed is:

1. A method comprising:

receiving, by a mobile terminal having a first wireless interface for cellular communication in a mobile telecommunications network and having a second wireless interface for non-cellular wireless communication in at least one frequency band, information from said mobile telecommunications network via said first wireless interface, said information comprising a code associated with the mobile telecommunications network;

processing said information;

disabling, based on an outcome of said processing of said information, said second wireless interface from wireless communication in at least one frequency band; and wherein said processing determines whether one or more frequency bands of the second wireless interface should be disabled based on a lookup of the code in reference data stored in the mobile terminal, the reference data indicating predetermined access information for the second wireless interface according to codes.

2. The method as defined in claim 1, wherein said information further comprises control information from a node in said mobile telecommunications network over said first wireless interface.

3. The method as defined in claim 2, wherein said step of disabling is performed if said control information includes a disabling command.

4. The method as defined in claim 1, wherein said at least one frequency band disabled in said step of disabling is a frequency band which is unlicensed in a first country or geographic area, but is reserved, prohibited or otherwise unavailable in a second country or geographic area, wherein said step of disabling is performed if the information received in said step of receiving indicates that said mobile telecommunications network is associated with said second country or geographic area.

5. The method as defined in claim 4, wherein said step of processing involves comparison between contents of said information and said reference data stored in local memory of said mobile terminal, and wherein said step of disabling is performed if the outcome of said processing is a match from said comparison, indicating that said mobile telecommunications network is associated with said second country or geographic area.

6. The method as defined in claim 1, wherein said second wireless interface is capable of wireless communication in at least a first and a second frequency band, wherein said step of disabling involves disabling the second wireless interface from wireless communication in said first frequency band but not in said second frequency band.

7. The method as defined in claim 1, wherein said second wireless interface is capable of wireless communication in at least a first and a second frequency band, wherein said step of disabling involves disabling the second wireless interface from wireless communication in said first frequency band as well as in said second frequency band.

8. The method as defined in claim 1, wherein said second wireless interface is an interface adapted for connectionless packet data communication.

9. The method as defined in claim 1, wherein said second wireless interface is a wireless local area network interface.

10. An apparatus, comprising:

a first wireless interface for cellular communication in a mobile telecommunications network;

a second wireless interface for non-cellular communication; and a controller coupled to said first and second wireless interfaces, wherein the controller is adapted to:

receive information from said mobile telecommunications network via said first wireless interface, said information comprising a code associated with the mobile telecommunications network;

process said information by looking up said code in reference data stored in the mobile terminal, the reference data indicating predetermined access information for the second wireless interface according to codes; and disable, based on an outcome of said processing of said information, said second wireless interface from wireless communication in at least one frequency band.

11. The apparatus as defined in claim 10, wherein said information comprises control information from a node in said mobile telecommunications network.

12. The apparatus as defined in claim 11, wherein the controller is adapted to disable said second wireless interface if said control information includes a disabling command.

13. The apparatus as defined in claim 10, wherein the at least one frequency band is a frequency band which is unlicensed in a first country or geographic area, but is reserved, prohibited or otherwise unavailable in a second country or geographic area, wherein the controller is adapted to disable said at least one frequency band, if the information received from said mobile telecommunications network indicates that said mobile telecommunications network is associated with said second country or geographic area.

14. The apparatus as defined in claim 13, wherein the controller is adapted to process the information received from said mobile telecommunications network by comparing between contents of said information and said reference data stored in local memory of said mobile terminal, and wherein the controller is adapted to disable said at least one frequency band, if the outcome of said processing is a match from the comparison, indicating that said mobile telecommunications network is associated with said second country or geographic area.

15. The apparatus as defined in claim 10, wherein said second wireless interface is being capable of wireless communication in at least a first and a second frequency band, wherein the controller is adapted to disable the second wireless interface from wireless communication in said first frequency band but not in said second frequency band.

16. The apparatus as defined in claim 10, wherein said second wireless interface is capable of wireless communication in at least a first and a second frequency band, wherein the controller is adapted to disable the second wireless interface from wireless communication in said first frequency band as well as in said second frequency band.

17. The apparatus as defined in claim 10, wherein said second wireless interface is an interface adapted for connectionless packet data communication.

18. The apparatus as defined in claim 10, wherein said second wireless interface is a wireless local area network interface.

19. The apparatus as defined in claim 10, said second wireless interface being capable of wireless communication in at least a first and a second frequency band, said mobile terminal further having local memory for storing said reference data, wherein:

said reference data defines a mapping between different countries, geographic areas or mobile telecommunications networks, represented by at least one of a network code or operator code, and allowability or non-allowability of different frequency bands for non-cellular wireless communication;

the controller is adapted to receive said information over said first wireless interface as control information from a node in said mobile telecommunications network;

the controller is adapted to process said control information received from said node by deriving at least one of a network code or operator code associated with said mobile telecommunications network, and comparing the derived network code or operator code to said reference data to produce said outcome of said processing; and the controller is adapted to disable the second wireless interface from wireless communication in said first frequency band, said second frequency band, none of said first and second frequency bands, or both of said first and second frequency bands, depending on said out-come of said processing.

20. The apparatus as defined in claim 19, wherein said local memory comprises non-volatile memory in which said reference data is stored in a manner that prevents manipulation.

21. The apparatus as defined in claim 10, further having a user interface, wherein the controller is adapted to provide an alert in said user interface, before disabling said second wireless interface.

22. The apparatus as defined in claim 21, wherein the controller is further adapted, after having provided said alert in said user interface, to await a confirmation from a user of the mobile terminal before disabling said second wireless interface.

* * * * *